(12) United States Patent
Gordon

(10) Patent No.: US 9,436,767 B2
(45) Date of Patent: Sep. 6, 2016

(54) SERVING CONTENT ITEMS BASED ON DEVICE ROTATIONAL ORIENTATION

(71) Applicant: Google Inc., Mountain View, CA (US)

(72) Inventor: Marcel Phillip Gordon, London (GB)

(73) Assignee: Google Inc., Mountain View, CA (US)

( * ) Notice: Subject to any disclaimer, the term of this patent is extended or adjusted under 35 U.S.C. 154(b) by 145 days.

(21) Appl. No.: 13/787,976

(22) Filed: Mar. 7, 2013

(65) Prior Publication Data
US 2014/0258870 A1 Sep. 11, 2014

(51) Int. Cl.
G06F 17/30 (2006.01)
G06F 1/16 (2006.01)

(52) U.S. Cl.
CPC ....... *G06F 17/30867* (2013.01); *G06F 1/1694* (2013.01); *G06F 2200/1614* (2013.01); *G06F 2200/1637* (2013.01)

(58) Field of Classification Search
CPC ............. G06F 3/0346; G06F 1/1694; G06F 2200/1637; G06F 3/04846; G06F 2200/1614; H04M 1/72572
USPC ....... 715/710, 744–747, 749, 789, 798, 832, 715/863, 864; 345/158
See application file for complete search history.

(56) References Cited

U.S. PATENT DOCUMENTS

| 8,792,912 | B2* | 7/2014 | Gits et al. | 455/456.3 |
|---|---|---|---|---|
| 2007/0085759 | A1 | 4/2007 | Lee et al. | |
| 2010/0035656 | A1* | 2/2010 | Pan | 455/566 |
| 2010/0083163 | A1 | 4/2010 | Farzin et al. | |
| 2010/0222046 | A1* | 9/2010 | Cumming | 455/418 |
| 2011/0246618 | A1 | 10/2011 | Howard et al. | |
| 2011/0264928 | A1* | 10/2011 | Hinckley | 713/300 |
| 2011/0320956 | A1 | 12/2011 | Singh et al. | |
| 2013/0033523 | A1* | 2/2013 | Stovicek et al. | 345/649 |
| 2013/0222231 | A1* | 8/2013 | Gardenfors et al. | 345/156 |
| 2013/0253900 | A1* | 9/2013 | Escobedo | 704/2 |
| 2014/0085201 | A1* | 3/2014 | Carmel-Veilleux et al. | 345/158 |
| 2014/0208333 | A1* | 7/2014 | Beals et al. | 719/318 |

FOREIGN PATENT DOCUMENTS

| EP | 2261788 | 12/2010 |
|---|---|---|
| KR | 2012-0020915 A | 3/2012 |
| KR | 1020120020915 | 3/2012 |

OTHER PUBLICATIONS

International Search Report dated Mar. 21, 2014 for corresponding International Application No. PCT/US2013/074706.
International Preliminary Report on Patentability issued in PCT/US2013/074706, dated Sep. 17, 2015.

* cited by examiner

*Primary Examiner* — Andrew Tank
(74) *Attorney, Agent, or Firm* — Foley & Lardner LLP; John D. Lanza

(57) ABSTRACT

Method and apparatus for providing content items to a network accessible device responsive to a rotational orientation of the device. In accordance with some embodiments, a first rotational orientation of a display screen of the network accessible device is identified. A first content item is transferred across a network for display on the screen in said first orientation responsive to a request from the device. A change of the display screen to a different, second rotation orientation is detected. A second content item for display on the screen in said second rotational orientation is transferred across the network to the device responsive to said change of the display screen to the second orientation.

18 Claims, 5 Drawing Sheets

SERVING CONTENT ITEMS BASED ON DEVICE ROTATIONAL ORIENTATION

BACKGROUND

Content providers (publishers) generally provide content for display on various network accessible devices (e.g., smart phones, tablets, laptops, e-readers, etc.). The content (publisher display items) can take a variety of forms, such as web pages, mobile applications (apps), audio works (e.g., mp3 files), video works, textual works (e.g., e-books), etc.

The publisher display items can be arranged to request and display one or more content items (such as advertisements) in specially configured slots. The content items may establish links to landing pages owned by third parties. The display of content items can provide a number of benefits to the publisher, such as revenue opportunities when the user of the device views and/or selects (clicks) a content item.

Some network accessible devices may have two or more display screen sizes depending on the rotational orientation of the device. For example, the device may have a first display screen size corresponding to a portrait orientation, and a second display screen size corresponding to a landscape orientation. The user can switch between these orientations by rotating the device 90 degrees.

SUMMARY

Various embodiments disclosed herein are generally directed to an apparatus and method for providing content items to a network accessible device responsive to a rotational orientation of the device.

In accordance with some embodiments, a first rotational orientation of a display screen of the network accessible device is identified. A first content item is transferred across a network for display on the screen in said first orientation responsive to a request from the device. A change of the display screen to a different, second rotation orientation is detected. A second content item for display on the screen in said second rotational orientation is transferred across the network to the device responsive to said change of the display screen to the second orientation.

These and other features and advantages which may characterize various embodiments can be understood in view of the following detailed discussion and the accompanying drawings.

DETAILED DESCRIPTION

Figure 1:
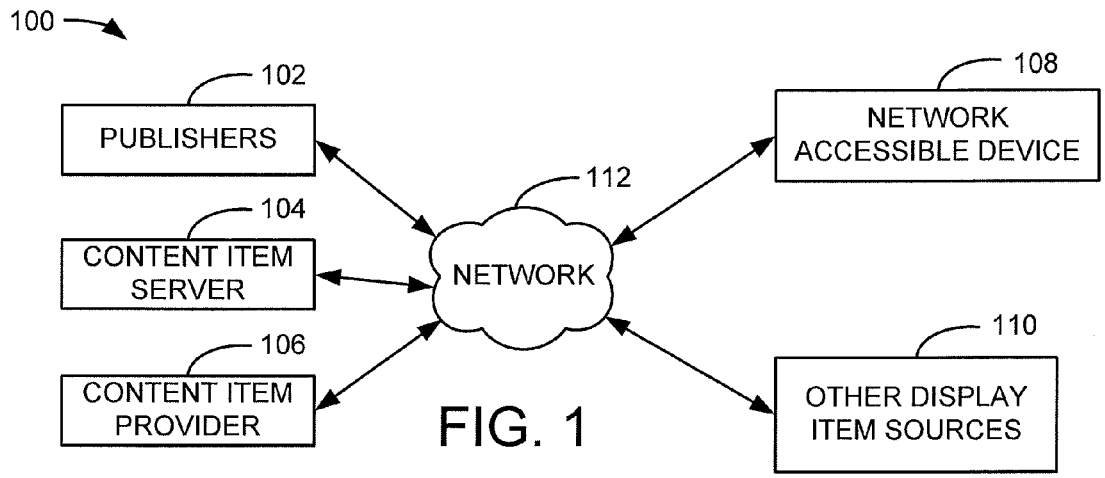
FIG. 1 provides a functional block representation of a network-based system in accordance with various embodiments.

The present disclosure generally relates to providing content items to a network accessible device in relation to a detected rotational orientation of the device.

When a user of a network accessible device requests information from a publisher, a publisher display item can be displayed on the device via a graphical user interface (GUI) of the device. Publisher display items may take a variety of forms, such as but not limited to a web page, a mobile app, an e-reader book, an email service, a search engine, a game, an audio work, a video work, etc.

A publisher display item may include content supplied by the publisher as well as one or more slots to accommodate the insertion of content item(s) from third parties. The content items may be selected from a population of available content items from various content item providers. The content items can take a variety of forms, such as advertisements, communications, public service announcements, invitations to participate in a survey, petition, or some other activity, etc.

In some cases, the content items can include a creative portion and an interactive portion. The creative portion may provide textual, audio, image and/or video information to the user. The interactive portion, when selected ("clicked") by the user, connects the device to a linked web page or other location ("landing page") associated with the creative portion.

In an effort to improve user response to content items, content item providers often endeavor to select publisher display items that are appropriate outlets for their content items. For example, an advertiser for a particular product or service, for example, may wish to have its content items displayed on publisher display items that cover topics relevant to the product/service offered by the advertiser, and in a visual format preferred by the advertiser.

Accordingly, various embodiments of the present disclosure generally operate, as explained below, to detect a rotational orientation of a network accessible device, and to provide a first content item for display on the device in the detected orientation. If the device is rotated by the user to a new orientation while the first content item continues to be displayed on the device, a request is issued for a second content item, and the second content item is transferred across the network to the device for display on the device in the new orientation.

The first and second content items may be associated with the same entity, or the content items may be independent and associated with different entities. If related, the first content item can include an invitation to the user to rotate the device in order to receive the second content item. In either case, change in orientation of the device can be detected as a user response, and can be potentially used, for example, as a click (conversion). Tags may provide for a plurality of orientations for the network accessible device, and the particular orientation may affect the size of the content item(s) displayed on the network accessible device.

A first orientation of the device may be a portrait orientation, and a second orientation of the device may be landscape orientation. The content items may be optimized for one or more of the plurality of orientations as well as one or more detected context changes. Context changes may include geoposition, user input content on a web page, network connectivity, etc.

These and other features and benefits of the present disclosure can be understood beginning with a review of FIG. 1 which depicts a network-based data transfer system 100 constructed and operated in accordance with various embodiments.

For purposes of providing a concrete example, the content items serviced by the system 100 will be contemplated as comprising advertisements (ads) which are displayed in various ad slots in different types of publisher display items. It will be appreciated that this is merely for purposes of illustration and is not limiting.

The system 100 incorporates a number of active elements including publisher servers 102, a content item server 104, a content item provider server 106, and at least one user network accessible device 108. The publisher servers 102 are contemplated as providing publisher web pages for display on the device 108, or other publisher content such as A/V works, mobile apps, e-books, etc.

The various servers and devices in FIG. 1 communicate via a network fabric 112, which may constitute one or more communication networks such as the Internet, a WAN (wide area network), a LAN (local area network), a broadband wireless network, etc.

The publishers 102 represent web page hosting servers or similar systems adapted to transfer web pages from websites to the device 108. The content item server 104 services content item requests to display content items in conjunction with the web pages. The content item provider server 106 can be associated with a source or owner of the goods or services associated with the content items supplied by the content item server.

The network accessible device 108 can take a variety of forms, such as a computer, smart phone, tablet, gaming console, television, or other similar device adapted to interact with the publisher 102, content item server 104, content item provider server 106 and other sources 110. It is contemplated for purposes of the present discussion that the device 108 is a wireless mobile device adapted to display information in a number of different rotational orientations, such as a smart phone with a rectangular display screen having four different rotational orientations (two in an "up-and-down" portrait mode and two in a "sideways" landscape mode). It will be appreciated that other elements may be incorporated into the system 100 as desired.

Figure 2:
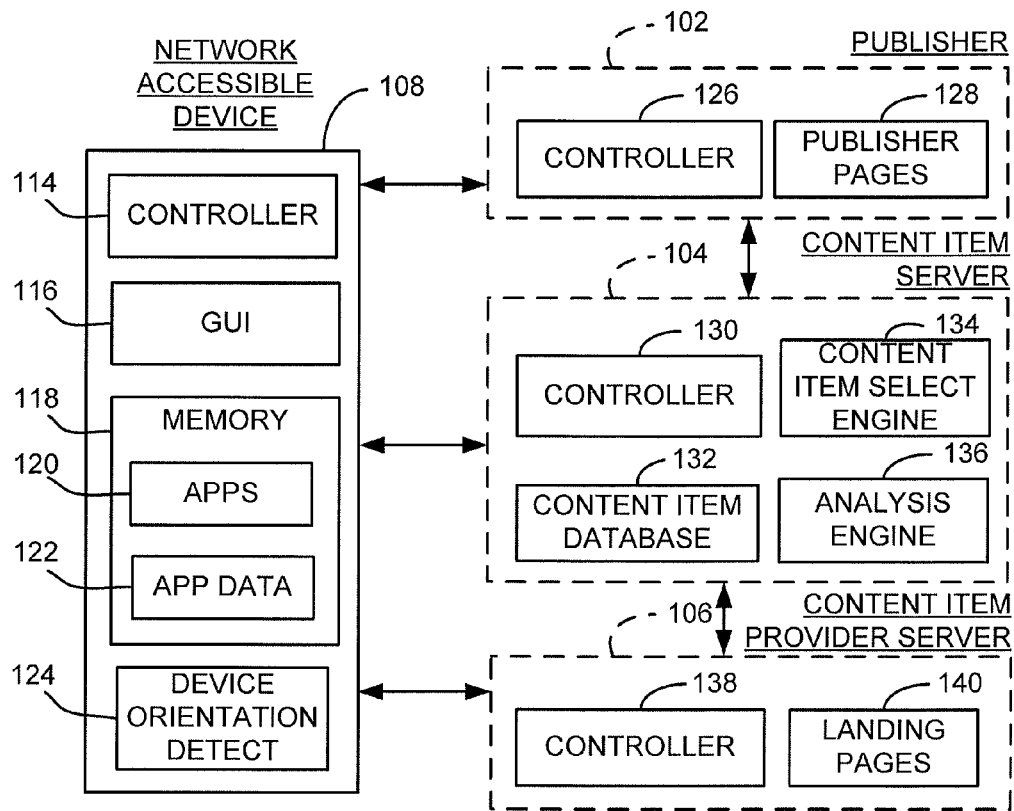
FIG. 2 provides another functional block representation of the network-based system in accordance with various embodiments.

FIG. 2 shows aspects of the system 100 of FIG. 1 in accordance with some embodiments. The device 108 includes a controller 114, a graphical user interface (GUI) 116 and memory 118. The controller 114 may be a programmable processor that uses associated operating system programming and application software (e.g., a web browser) in the memory to interact with the network 112.

In the context of the exemplary smart phone, the GUI 116 includes a touch screen, one or more user selectable buttons, one or more speakers, a headphone jack, etc. The memory 118 represents a hierarchical memory structure made up of various memory devices within the user device 108, including such elements as a non-volatile main memory (e.g., disc memory, solid-state drive, etc.), data transfer buffer, local processor (L1-L3) cache, etc. The memory 118 stores various operational modules including applications (apps) 120 and application (app) data 122.

A device orientation detection module 124 uses one or more accelerometers and/or other sensors to monitor the rotational orientation of the device 108 during use. For example, the device may be initially oriented by the user so that the display screen is in a portrait mode. If the user rotates the device about a quarter-turn (e.g., about 90 degrees), the module 124 will detect the rotation of the device and signal the GUI 116 to reformat the current display to a landscape mode. As explained below, if a content item (e.g., a first mobile ad) is currently being displayed on the device, detection of a change in rotational orientation may further signal a request for a new content item (e.g., a second mobile ad) to be displayed on the device.

A selected publisher server 102 may include a controller 126 and a memory which stores a number of available publisher web pages 128. The web pages are transferred responsive to requests from the device 108.

The content item server 104 may include a controller 130, a content item database 132 in associated memory, a content item selection engine 134, and an analysis engine 136. The content item selection engine 134 may be realized as a processor routine stored in the memory and executed by the controller 130, or may be a separate hardware or software module (including a remote module). The content item selection engine 134 generally operates to transfer one or more content items from the database 132 for display on the device 108 in response to content item requests from web pages and other display items loaded onto the device. The analysis engine 136 may be configured to access a number of different databases for different types of publisher display items.

The content item provider server 106 is a type of publisher server for an entity associated with at least one of the content items (e.g., ads) in the content item server. The content item provider server 106 includes a controller 138 and a set of landing pages 140 in associated memory.

Figure 3:
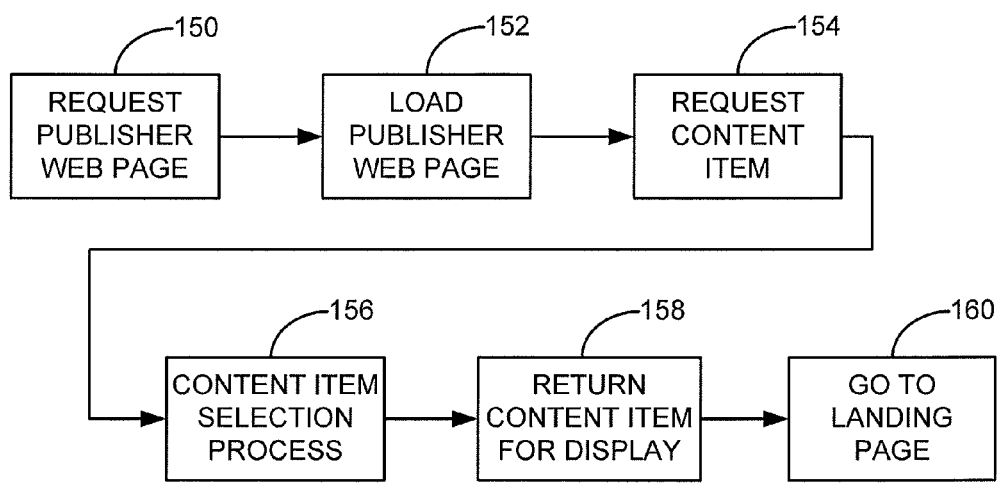
FIG. 3 illustrates an example manner in which a content item can be requested for display in a publisher display item using the system of FIGS. 1-2.

FIG. 3 illustrates a sequence of steps that can be carried out by the system of FIG. 2. At block 150, the device 108 requests a specific publisher web page from an associated publisher server 102. This may be initiated in a variety of ways, such as the user activating a web browser application on the smart phone and typing in a URL address associated with the requested page. The device 108 generally issues a request to the publisher server 102 for the selected web page, which is accessed and returned to the user device 108 for loading on the GUI 116 (block 152).

During the loading of the selected web page, a request for a content item may be issued from the device 108 to the content item server 104, as shown by block 154. A content item selection process is carried out at block 156 to select an appropriate content item. The content item selection process may incorporate an automated auction or other content item selection process to identify an appropriate content item for display on the device. The content item selection process is responsive to the orientation of the device 108 when the specific publisher page is requested. Further aspects of the content item selection process will be discussed in detail below.

The selected content item is returned at block 158 for display on the user device 108. Upon user selection (a "conversion") of the content item, the device 108 is connected to an associated landing page at block 160. The loading of the landing page at block 160 is carried out in a manner similar to that discussed above in blocks 152, 154.

Figure 4:
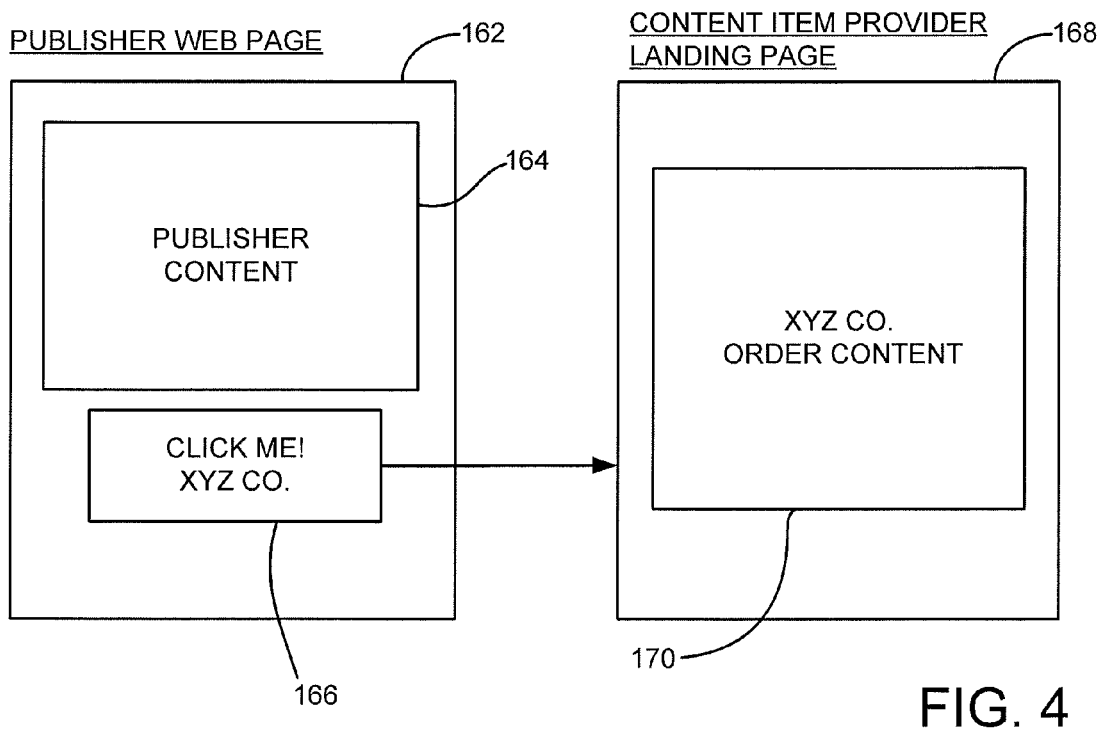
FIG. 4 illustrates selection (such as conversion) of a content item and its relationship to an associated content item provider landing page in accordance with various embodiments.

FIG. 4 illustrates the sequence of FIG. 3 in greater detail. An example publisher web page (publisher display item) 162 is loaded to and displayed on the device (see 108 in FIG. 2). The publisher web page 162 has publisher content 164 and a content item 166 for a content item provider "XYZ Co." User selection of the content item 166 results in the loading of an content item provider landing page 168 from the XYZ Co. content item provider server 106 with associated order content 170 associated with products, services or other information associated with XYZ Co.

Figure 5A:
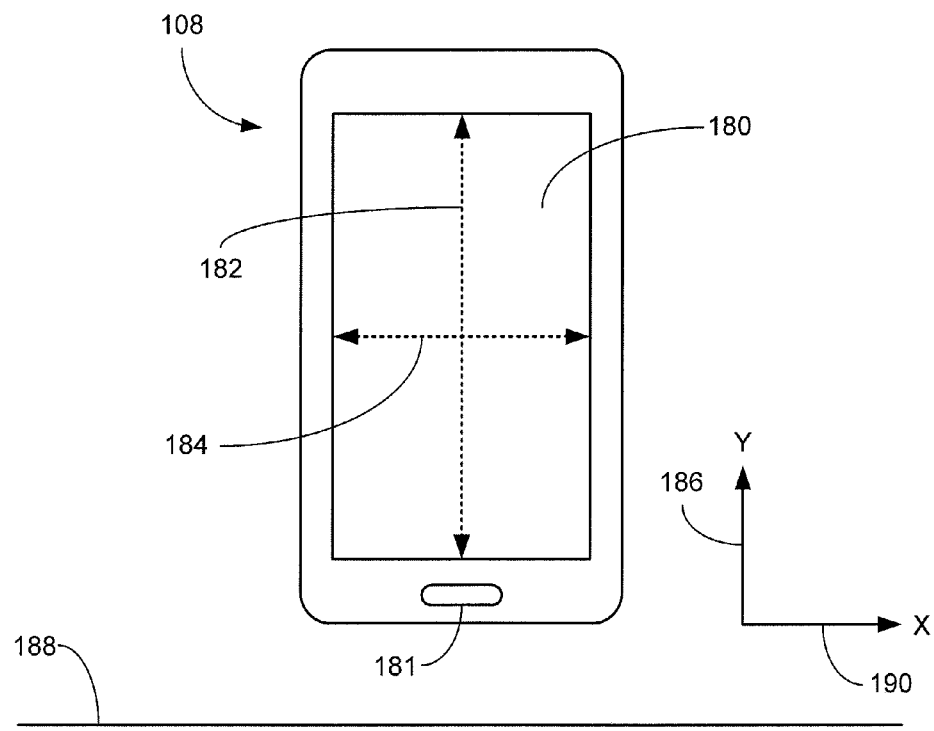
FIG. 5A shows a network accessible device in portrait orientation in accordance with various embodiments.
Figure 5B:
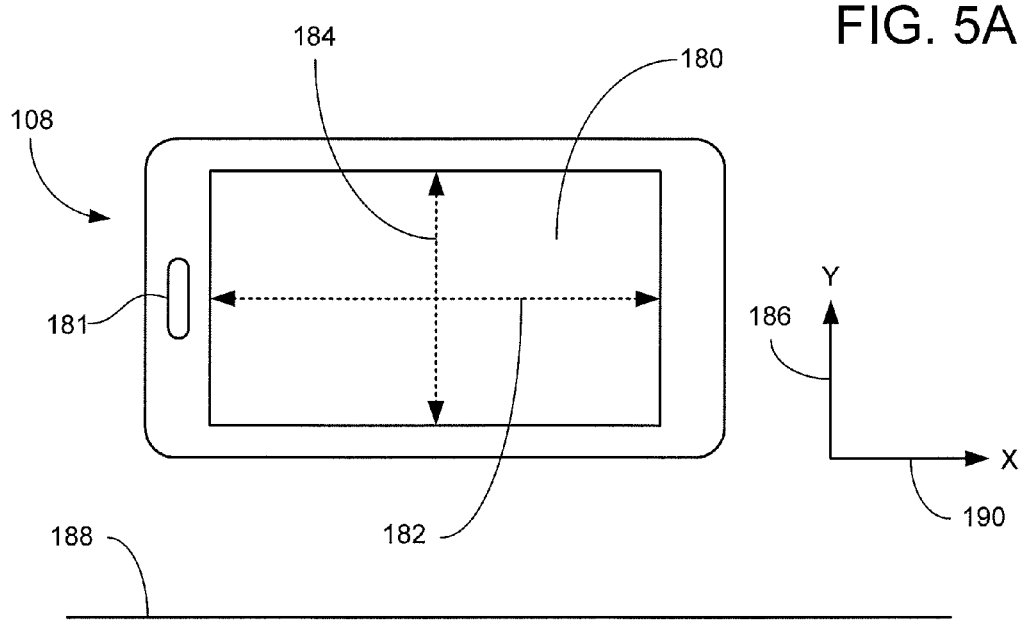
FIG. 5B shows a network accessible device in landscape orientation in accordance with various embodiments.

FIGS. 5A-B show the network accessible device 108 with display screen 180 and user selectable button 181. The display screen 180 has a rectangular shape with a longer dimension (height) 182 and a shorter dimension (width) 184, as measured by length and/or pixels. The height 182 is substantially perpendicular to the width 184. In a Cartesian coordinate system, a Y direction 186 may be defined as substantially perpendicular to the ground 188 (e.g., vertical), and an X direction 190 may be defined as substantially parallel to the ground 188 (e.g., horizontal).

FIG. 5A shows the network accessible device 108 in a portrait orientation, and FIG. 5B shows the network accessible device 108 in a landscape orientation. The orientation of FIG. 5B can be achieved by rotating the device 108 90 degrees in a clockwise direction from the orientation of FIG. 5A.

The device 108 can be placed in a second portrait orientation (not shown) with the button 181 at the top of the device by rotating the orientation of FIG. 5B another 90 degrees in a clockwise direction. The device 108 can be placed in a second landscape orientation (also not shown) with the button 181 on the right side of the device by rotating the orientation of FIG. 5A in a counter-clockwise direction. This provides a total of four (4) possible rotational orientations for the device 108. It will be appreciated that other devices may have fewer available orientations, such as a single portrait orientation and a single landscape orientation.

The aspect ratio of the display screen 180 is defined as the ratio of the height 182 to the width 184 in landscape orientation. The aspect ratio shown in FIG. 5B is about 16:9, although other ratios may be used.

Figure 6:
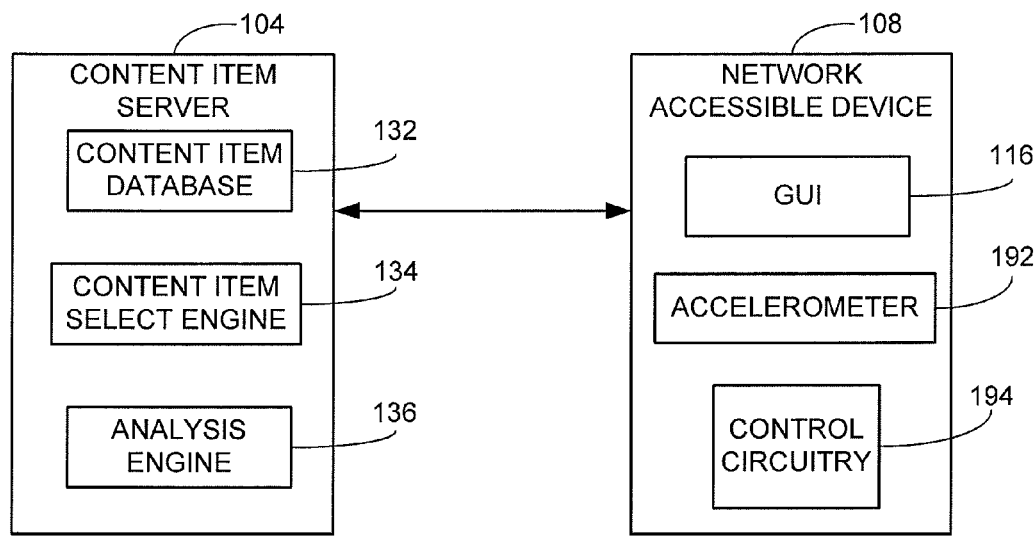
FIG. 6 provides a functional block diagram representation of a network-based system in accordance with various embodiments.

FIG. 6 shows portions of the network accessible device 108 in conjunction with portions of the content item server 104 of FIG. 2. The device 108 includes an accelerometer 192 and control circuitry 194 which may form a part of the device orientation detection module 124 of FIG. 2. The accelerometer 192 is a sensor that senses motion in one or more dimensions and creates an output signal, such as an electrical signal, that conveys information regarding the detected motion.

The control circuitry 194 communicates the output of the accelerometer 192 to the screen control aspects of the GUI 116 to change the orientation of the displayed content on the display screen 180. For example, as discussed above in FIGS. 5A-5B, a detected rotation event will cause the control circuit 194 to signal a change in display orientation from a first orientation (such as the portrait orientation of FIG. 5A) to a second orientation (such as the landscape orientation of FIG. 5B).

Figure 7:
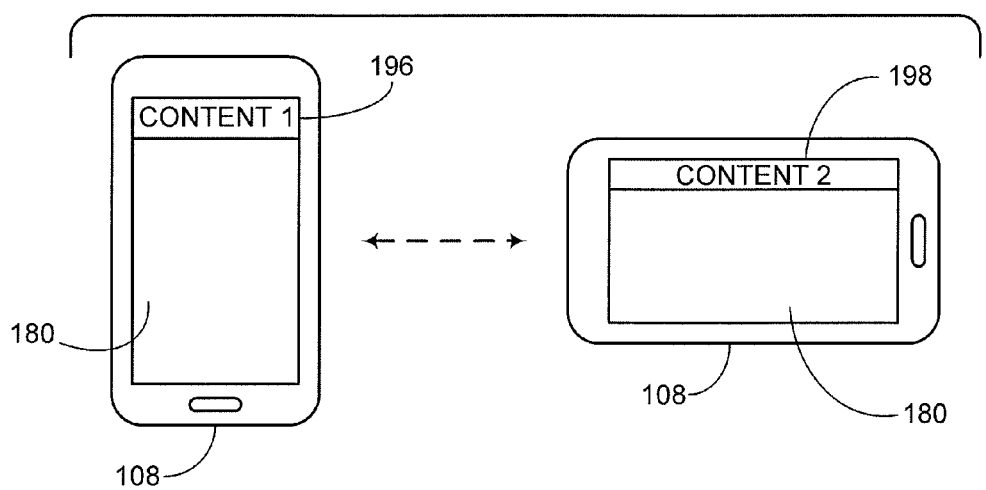
FIG. 7 graphically illustrates different orientations of the network accessible device and content item slots in accordance with various embodiments.

The control circuitry 194 is further adapted to issue, directly or indirectly, a request to the content item server 104 for a content item responsive to the detected change in orientation of the device 108. This is illustrated in FIG. 7, which shows a first content item (content 1) 196 displayed on the display screen 180 responsive to a first content item request by the device 108. The first content item may have been supplied to the device 108 in accordance with the sequence of FIG. 3.

Subsequent rotation of the device 108 by the user, as depicted in FIG. 7, results in a request for a second content item to the server 104. The request results in the second content item (content 2) 198 being displayed on the display screen 180. Both the first and second content items may be provided in different content item slots provided in the publisher content on the screen. The first content item may be displayed in a slot having a size of about 320×50 pixels (in portrait mode); the second content item 198 may be displayed in a slot having a size of about 480×32 pixels (in landscape mode). The areal size (in pixels) of the respective content items may be the same, or may be different.

The areal size of the respective content items may occupy substantially the entire area of the display screen 180, or the content item may be the only display item on the display screen 180. In these situations, rotation of the device 108 by the user may be attributed to the user interacting with the content item. That is, rotation of the device 108 may be considered user selection (a "conversion") of the content item.

When the content item occupies less than substantially the entire area of the display screen 180, such as when the content item is not the only display item on the display screen 180, the control circuitry 194 may attribute the rotation of the device 108 by the user to interaction of the user with the content item or with another display item on the display screen 180. For example, the user could be playing a game that utilizes rotation of the device 108 for the user to interact with the game, such that rotation of the device 108 is attributed to the user interacting with the game, not the user interacting with the content item. Alternatively, rotation of the device 108 by the user may be attributed to user selection of the content item, although there is another display item on the display screen 180. Nevertheless, whether the content item occupies substantially the entire screen or a portion thereof, it is contemplated that a variety of configurations can be enacted whereby user manipulation of the device can be tracked as interaction with the content item.

The publisher content displayed on the screen 180 may be produced using a variety of programming languages, such as but not limited to JavaScript (JS). In a JS environment, the publisher content may be configured to periodically issue requests, in the form of JS tags, for the content items in the associated slots. In such case, each time a new rotational orientation is detected, a new JS based request may be issued and new content supplied for display. The request may include the size of the available content item slot as well as other pertinent information, such as the new rotational orientation of the device 108.

In some embodiments, each time a new request is issued, the content item selection engine 134 initiates an content item selection process and identifies a new content item for display on the device 108. The new content item may be independent of the previous item. For example, the "content 1" item 196 in FIG. 7 may be a promotional message associated with a first entity (e.g., "ABC Co."), and the subsequently displayed "content 2" item 198 in FIG. 7 may be a promotional message associated with a different, second entity (e.g., "XYZ Co."). Further rotations of the device 108 by the user while maintaining the same publisher content on the screen 180 will similarly result in new content items being displayed in the associated landscape or portrait orientations. Conversion of any of these content items may involve the user clicking (e.g., depressing the touch screen) in the region of the respective content item slots, resulting in a redirection of the display as discussed above in FIGS. 3-4 to an associated landing page or other publisher content associated with the selected content item.

Conversely, the analysis engine 136 can operate to detect patterns in a sequence of requests received from a selected device 108, and can accordingly elect to serve content items that are related to one another, e.g., promotional messages associated with the same entity (e.g., ABC Co.). For example, if the engine 136 determines that two or more requests have been issued from the same device displaying the same content, the engine 136 can determine that the user is interacting with the sequence of content items being displayed, and can therefore provide further information in subsequent content items that drill down from the previously displayed content items.

In this latter embodiment, let it be assumed that the content 1 item 196 is a promotional message for a local restaurant proximate the geoposition of the device 108. The content 2 item 198 may be a different, second promotional message for the same restaurant. The respective content can take any number of suitable forms, including but not limited to business name, address, telephone number, offer for a map, walking directions, special offers, menu items, coupons, logos, photos, graphical depictions, etc.

In further embodiments, the first displayed content item can invite the user to rotate the device 108 to receive further information associated with the first content item. For example, the content item may provide a message to the user that states, in effect, "rotate your phone for a special offer." User rotation would result in detection of the new orientation, a new request being sent to the content item server 104, and transfer and display of the second content item which may provide a coupon or other special offer to the user for the first content item.

In another embodiment, the first content item may provide a message to the user that states, in effect, "rotate left for a menu; rotate right for walking directions to our restaurant." In such case, rotation of the device 108 to the left (e.g., in a counter-clockwise direction) may result in request, transfer and display of the second content item in the form of a menu that is displayed on a portion of, or the entirety of, the display screen 180. Similarly, rotation of the device 108 to the right (e.g., in a clockwise direction) may result in request, transfer and display of the second content item in the form of walking directions and other information that is displayed on a portion of, or the entirety of, the display screen 180.

In both cases, it will be noted that the user interaction with the first content item results in the display of the second content item, and this interaction can be treated as a conversion of the first content item. In some embodiments, entities associated with content items may contract with the content item server or other party to display the content items and may further arrange to transfer funds responsive to such display and/or the conversion of such content items. Accordingly, using detected rotational orientation of the device can provide an efficient mechanism for conversions of content items.

By providing a system for optimizing content items for the content item slots present with different orientations of the network accessible device, a content item provider can use the content item provider's preferred orientation for presentation of the content item. This may help the publisher achieve the campaign goals of the content item provider.

Figure 8:
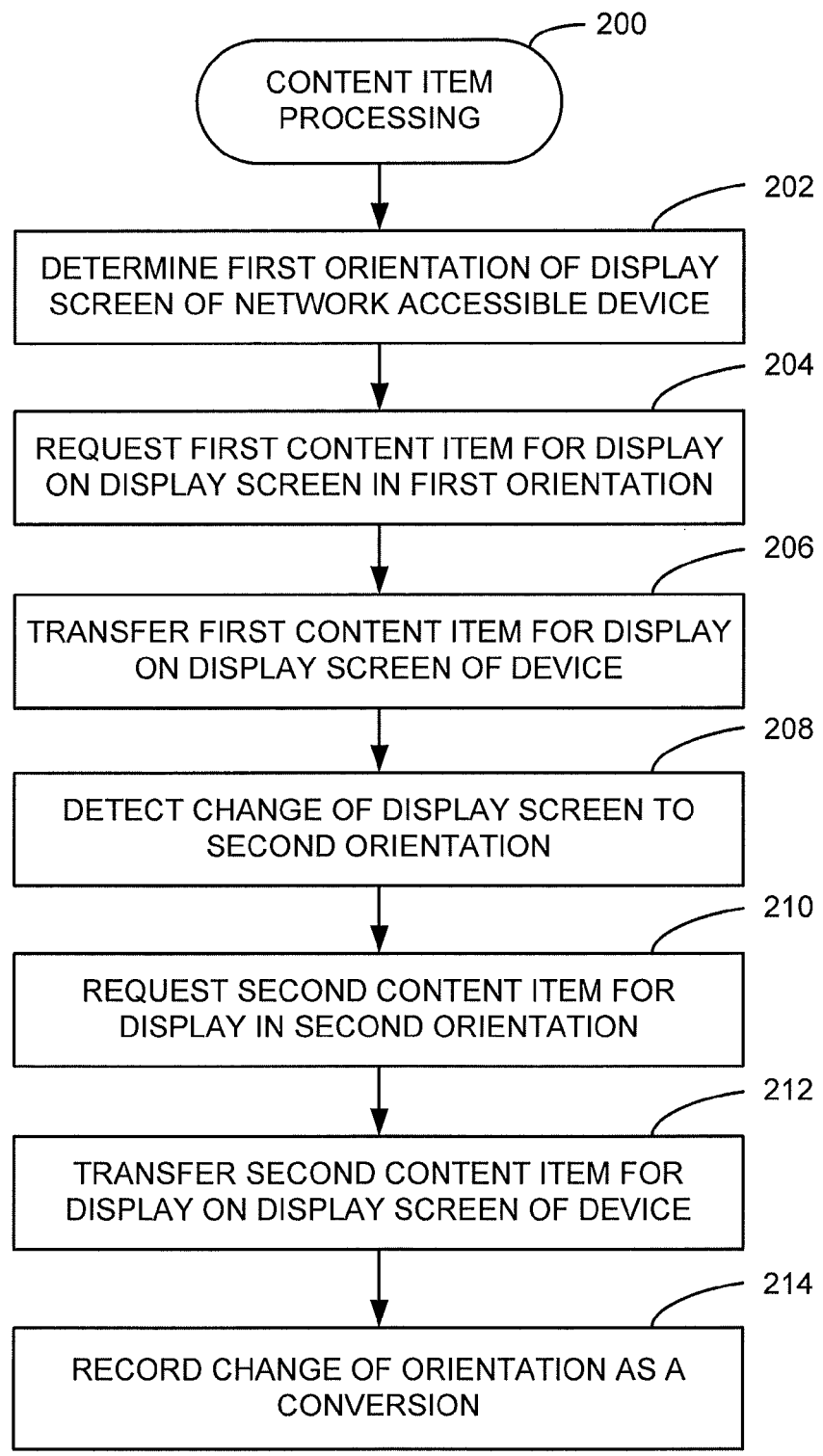
FIG. 8 is a flow chart for a CONTENT ITEM PROCESSING routine generally illustrative of steps carried out in accordance with some embodiments.

FIG. 8 sets forth a CONTENT ITEM PROCESSING routine 200 generally illustrative of steps that may be carried out in accordance with the foregoing discussion. At step 202, a first orientation of a display screen of a network accessible device is determined, such as the screen 180 of device 108 as oriented in the portrait orientation of FIG. 5A. This can be detected, for example, using the accelerometer 192 and control circuitry 194 of FIG. 6.

A request for a first content item is issued by the device 108 at step 204. The request may include an orientation parameter indicative of the first orientation. In the portrait orientation, the orientation parameter might be "p" for portrait. In the landscape orientation, the orientation parameter might be "l" for landscape. Any other suitable nomenclature for designating the first orientation and the second orientation can be used as required. As noted above, publisher content commonly uses JavaScript tags to request content items, so that suitable JavaScript tags may be extended to provide information about the orientation of the device through the orientation parameter of the request.

At step 206, a first content item (such as the "content 1" 196 in FIG. 7) is transferred across a network to the device for display on the screen in the first orientation responsive to the request from the device in step 204.

At step 208, a change of the display screen by the user to a second orientation is detected, such as to the landscape orientation depicted in FIG. 5B. This detection event may be carried out by the accelerometer 192 and the control circuitry 194 as discussed above. In some embodiments, the JavaScript tags may be extended to listen for orientation change events from the control circuitry 194, and automatically issue a request for a new content item responsive to the detected change in rotational orientation. Alternatively, CSS selectors may be used to implement the new content item request.

At step 210, a request for a second content item is issued by the device 108 responsive to the detected change in rotational orientation. As before, the request may include a notation indicating the orientation of the device, as well as other context information.

A second content item is transferred across the network to the device at step 212 for display on the display screen in the second orientation. The second content item may be independent of the first content item, or may be related to the first content item. It will be noted, however, that the second content item is not cached to the device 108 when the first content item was transferred to the device, but instead is transferred only after subsequent rotation of the device. In this way, real time detection of the user manipulation of the device is detected and the second content item is transferred accordingly.

Context information may be used to determine whether to serve a related or independent context item as the second item. For example, if geopositioning signals from the device indicate the user is moving toward a physical location associated with the first content item, the analysis engine 136 may determine a related second content item may be more appropriate than an independent second content item.

Because the second content item is serviced in real time, the second content item can be more closely tailored to the environment of the device at the time of the request. A change of context may have occurred, for example, between the first and second requests. The second content item may be responsive to a detected geoposition of the device at the change of the display screen to the second orientation. That is, the device could have been at a first geoposition when the first orientation of the display screen was determined, and the device could be at a second geoposition when the second orientation is determined.

For example, if the first content item was a promotional message for a nearby coffee shop, and at the time of the request for the second content item the device 108 detects a local Wi-Fi signal associated with the coffee shop, the system may determine that the new geoposition of the device (e.g., proximate the coffee shop) may result in the display of a promotional message (e.g., a time-dependent coupon, etc.) for goods available from the coffee shop. In other words, because the user walked to (or near) the coffee shop, this change in context results in a more suitable new content item being displayed.

As another example, the second content item may be responsive to a user input content in the device at the change of the display screen to the second orientation. For example, the user may have entered information on a web page after the first content item request that the analysis engine can use to personalize the second content item to make the second content item more valuable to the user and content item provider. The user would be able to choose to share or not share this information, or user content, to personalize the content item request. The information may include demographic information, calendar events, etc. It will be appreciated that the system will be configured to not share or disclose any personally identifiable information associated with the user in such analyses. The user of the device is provided the opportunity to control whether programs or features collect information. Thus, the user controls if and/or how information is collected about the user and/or device and used by a content server.

In situations in which the systems and/or methods discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In a further example, the second content item may be responsive to a network connectivity of the device at the change of the display screen to the second orientation. For example, the network connectivity of the device when the first orientation is determined could be a fast Wi-Fi network connection, so the analysis engine may determine that the content item server should serve the first content item that is content rich with high bandwidth requirements. On the other hand, the second orientation may be determined when the network connectivity of the device is determined to be a slower 3G or 4G network connection. In such case, the analysis engine may determine that the content item server should serve a second content item that is less feature rich with lower bandwidth requirements. Of course, the network connectivity speeds could be reversed, or could be the same when the first and second orientations are determined. It will be appreciated that if the second content item was cached, or otherwise determined, when the first orientation of the network accessible device was determined, then the flexibility of what content items to provide responsive to the first and second orientations would be reduced.

In at least some embodiments, at step 214, the change of the display screen to the second orientation is recorded as a conversion associated with the first content item. In such case, the change in orientation of the device may be functionally equivalent to a selection by "clicking" the first content item. Each content item request may be counted as conversion, because each request will be displayed on the network accessible device. In the system disclosed, the content item is requested and the content item is displayed, such that rotation of the device from the first orientation to the second orientation initiates another content item request.

Because the change in orientation of the device may be unrelated to an intended action of the user to change the orientation of the device, there may be a time delay built into the system. For example, the change in orientation from the first orientation to the second orientation might need to last for some threshold time value; otherwise the analysis engine may not determine an content item based on the change in orientation of the device.

In summary, some embodiments are operative such that when the device is in a first orientation such as a portrait orientation, a request from opening an app or other publisher related activity results in the display of a content item appropriate for the display screen in the portrait orientation. When the device is subsequently transitioned to a different orientation such as a landscape orientation, a new request is issued, resulting in the display of content item appropriate for the display screen in the landscape orientation. This continues so long as further changes in rotational orientation are made to the device. In some embodiments, each of the content items are related to a common entity, and in further embodiments the continued sequential rotation causes the user to "drill down" to further content that is served in real time.

In accordance with the foregoing discussion, it will be understood that the "display" of a publisher display item on a graphical user interface (GUI) can be in any user detectable form, including but not limiting to visual, audible or other sensory form. Reference to "different types" of display items will be understood consistent with the foregoing discussion to describe different classes of display items that provide different file format displays for a user (e.g., text, audio, video, still images, mobile apps, etc.).

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:
1. A computer implemented method comprising:
receiving a first request for a first content item comprising a first request parameter indicative of a first orientation of a display screen of a network accessible device, the first request transmitted responsive to detection of a monitoring tag in a publisher content, the monitoring tag monitoring an orientation of the display screen of the network accessible device while the publisher content is displayed;

selecting a first content item responsive to receiving the first request parameter;

transferring across a network to the network accessible device the first content item for display on the screen in the first orientation responsive to the first request, the first content item displaying an indication that rotation of the display screen of the network accessible device to a second orientation will display a second content item;

receiving a second request for the second content item comprising a second request parameter indicative of a second orientation of the display screen of the network accessible device, the second request transmitted responsive to the monitoring tag detecting the transition of the display screen of the network accessible device to the second orientation of the display screen of the network accessible device;

selecting the second content item responsive to receiving the second request parameter;

transferring across the network to the network accessible device the second content item for display on the screen in the second orientation responsive to the change of the display screen to the second orientation, and recording the change of the display screen to the second orientation as a user interaction with the first content item by increasing a conversion count associated with the first content item displayed with the publisher content.

2. The computer implemented method of claim 1, in which the selection of the second content item is responsive to a geoposition of the device at said change of the display screen to the second orientation.

3. The computer implemented method of claim 1, in which the selection of the second content item is responsive to a user input content in the device at said change of the display screen to the second orientation.

4. The computer implemented method of claim 1, in which the selection of the second content item is responsive to a speed of the network connectivity of the device at said change of the display screen to the second orientation.

5. The computer implemented method of claim 1, in which the first and second content items are promotional messages associated with an entity.

6. The computer implemented method of claim 1, in which the indication that rotation of the display screen of the network accessible device to the second orientation will display the second content item further comprises a direction of rotation.

7. A non-transitory computer readable medium which stores programming adapted for execution by one or more processors to:

receive a first request for a first content item comprising a first request parameter indicative of a first orientation of a display screen of a network accessible device, the first request transmitted responsive to detection of a monitoring tag in a publisher content, the monitoring tag monitoring an orientation of the display screen of the network accessible device while the publisher content is displayed;

select a first content item responsive to receiving the first request parameter;

transfer to a network accessible device the first content, the first content item adapted for display on a display screen of the device in said first detected rotational orientation and the first content item displaying an indication that rotation of the display screen of the network accessible device to a second orientation will display a second content item;

receive a second request for the second content item comprising a second request parameter indicative of the second orientation of the display screen of the network accessible device, the second request transmitted responsive to the monitoring tag detecting the transition of the display screen of the network accessible device to the second orientation of the display screen of the network accessible device and after a time delay during which the monitoring tag detects no transition of the display screen of the network accessible device back to the first orientation;

select the second content item responsive to receiving the second request parameter;

transfer to the device the second content item responsive to receiving the second request parameter, the second content item adapted for display on the display screen of the device in said second detected rotational orientation, and recording the receipt of the second request as a user interaction with the first content item by increasing a conversion count associated with the display of the first content item displayed with the publisher content.

8. The medium of claim 7, in which the selection of the second content item is responsive to a geoposition of the device at the transition of the display screen to the second orientation.

9. The medium claim 7, in which the first content item is a promotional message associated with a selected entity having a physical location proximate the device, and the second content item is a second promotional message associated with the selected entity.

10. The medium of claim 7, in which the second content item is selected responsive to a speed of network connectivity of the device at said change of the display screen to the second orientation.

11. The medium of claim 7, in which the first and second content items are independent promotional messages associated with different entities having different physical locations proximate the device.

12. The medium of claim 7, in which the indication that rotation of the display screen of the network accessible device to the second orientation will display the second content item further comprises a direction of rotation.

13. An apparatus comprising:

a memory which stores a population of publisher display items each adapted to be respectively displayed on a graphical user interface (GUI) of a network accessible device;

a content item server configured to:

receive a first request for a first content item comprising a first request parameter indicative of a first orientation of a display screen of the network accessible device, the first request transmitted responsive to detection of a monitoring tag in the publisher display items, the monitoring tag monitoring orientation of the display screen of the network accessible device while a publisher display item from the publisher display items is displayed;

transfer to the network accessible device the first content item for display on the display screen of the device in a first orientation responsive to the first request from the device;

receive a second request for a second content item comprising a second request parameter indicative of a second orientation of the display screen of the network accessible device, the second request transmitted responsive to the monitoring tag detecting the transition of the display screen of the network accessible device to the second orientation of the display screen of the network accessible device and after a time delay during which the tag detects no transition of the display screen of the network accessible device back to the first orientation;

transfer to the network accessible device the second content item for display on the screen in a second orientation responsive to receiving the second request parameter; and an analysis engine coupled to the memory adapted to select the first and second content items responsive to receiving the first and second requests and record the receipt of the second request as a user interaction with the first content item by increasing a conversion count associated with the display of the first content item with the publisher display item.

14. The apparatus of claim 13, in which the selection of the second content item is responsive to a detected geoposition of the device at the transition of the display screen to the second orientation.

15. The apparatus claim 13, in which the selection of the second content item is responsive to a user input content in the device at the transition of the display screen to the second orientation.

16. The apparatus of claim 13, in which the selection of the second content item is responsive to a speed of the network connectivity of the device at the transition of the display screen to the second orientation.

17. The apparatus of claim 13, in which the first and second content items are different promotional messages associated with a common entity having a physical location proximate the device.

18. The apparatus of claim 13, in which the first content item comprises a message to a user of the device that requests the user rotate the device to the second orientation to receive said second content item.

* * * * *